E. STEADMAN.
CHURN-DASHER.
No. 170,126.  Patented Nov. 16, 1875.
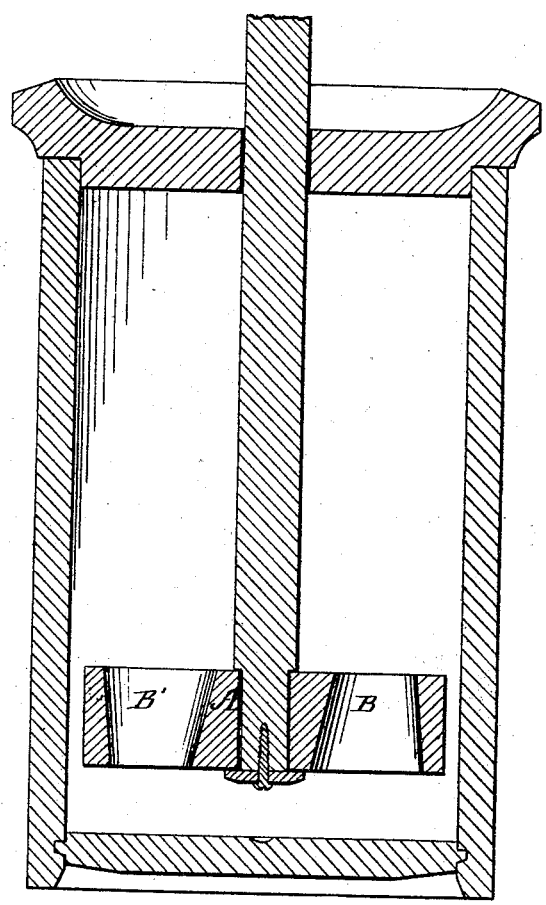
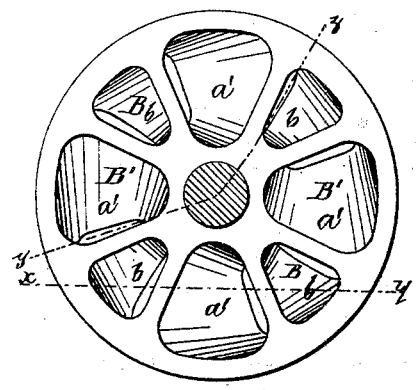
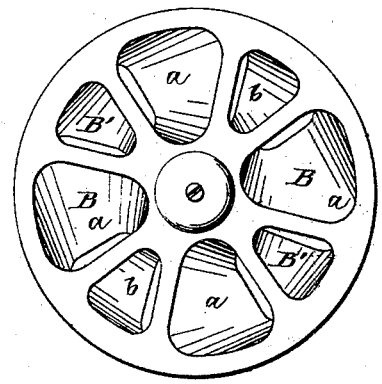
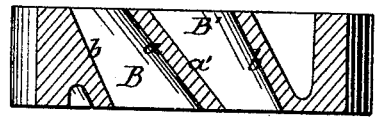
Witnesses:
Philip F. Larner
A. B. Cauldwell
Inventor:
Enoch Steadman
By Wm. C. Wood
Attorney

UNITED STATES PATENT OFFICE.

ENOCH STEADMAN, OF COVINGTON, GEORGIA.

IMPROVEMENT IN CHURN-DASHERS.

Specification forming part of Letters Patent No. 170,126, dated November 16, 1875; application filed October 6, 1875.

*To all whom it may concern:*

Be it known that I, ENOCH STEADMAN, of Covington, in the county of Newton and State of Georgia, have invented a certain new and useful Improvement in Churn-Dashers; and I do hereby declare that the following specification, taken in connection with the drawings forming a part of the same, is a clear and complete description thereof.

My improved dashers are employed in what are known as "reciprocating churns," and they are not only operated reciprocally, but have also a rotative movement independently of the dasher-handle.

The rotative movement of the dasher is effected by the passage of the cream through vertical apertures therein, and these apertures are so constructed that the globules of butter are promptly brought into contact with each other, thereby greatly facilitating the operation of churning.

The dasher-apertures are arranged in two series, the apertures of one series alternating with those of the other. As the dasher is forced downward the cream passes through both series, and the apertures of one series compress the cream as it passes through them, and when the dasher is moved upward the apertures of the other series operate on the cream in like manner.

My invention consists in a reciprocating churn-dasher rotatively mounted on its handle, and provided with apertures, which are larger at one end than at the other, have inclined sides, and are arranged alternately, so as to constitute two separate series; but to more particularly describe my invention, I will refer to the accompanying drawings, in which—

Figure 1 represents in vertical section a churn containing one of my improved dashers, the latter in section on line $y\ z$, Fig. 2. Figs. 2 and 3 represent the dasher in top and bottom views, respectively. Fig. 4 represents the dasher in vertical section on line $x\ y$, Fig. 2.

The dasher is mounted on the handle, so that it may rotate thereon, as shown at A. B in each instance denotes one of four apertures in the dasher. These apertures constitute one series. Each of these is largest at the under side of the dasher and smallest at the upper side. B' denotes in each instance one of four apertures, which constitute the second series. These are largest at the upper side and smallest at the lower side of the dasher. Each aperture is triangular in outline with rounded corners, and, as one end is smaller than the other, they are practically funnel-shaped. Their sides are irregularly inclined. Each has one long side, as at $a$ and $a'$, and a short side, as at $b$. The inclined sides $a$, when the dasher is forced downward through the cream, are acted upon thereby, so as to induce the rotation of the dasher, and when the dasher is lifted it is rotated in the opposite direction by the action of the cream on the inclined long sides $a'$ of the apertures B'.

In practice I prefer to have the area of the small end of each aperture equal to about one-third of the area of the large end.

Any desired number of apertures may be employed; but I have found that two series of four apertures each will perform good service.

The dasher should be of sufficient thickness to admit of having the inclined long sides of the apertures of sufficient area to induce rotation of the dasher, as described, and a thickness of from one to three inches will generally be ample for this purpose.

It will be seen that at each reciprocating movement of the dasher the cream in passing through one of the two series of apertures will be compressed in its passage, and, therefore, that the globules of butter will be brought into close contact with other, and thereby hasten the operation of churning.

It will also be seen that the rotation of the dasher serves to thoroughly agitate and mix the cream.

I am aware that rotatory reciprocating churn-dashers are not new; but I am not aware that prior to my invention a churn-dasher was ever made which was provided with funnel-shaped apertures having inclined sides, which not only compressed the cream in its passage through them, but imparted to the dasher a rotatory movement when operated reciprocally.

Having thus described my invention, I claim as new and desire to secure by Letters Patent—

A churn-dasher rotatively mounted on its handle and provided with funnel-shaped apertures, substantially as described, whereby, in its passage through the cream, the dasher is rotated and the cream compressed, as set forth.

ENOCH STEADMAN.

Witnesses:
A. J. HULSEY,
W. L. EZZARD.